United States Patent [19]
Wada et al.

[11] 3,845,409
[45] Oct. 29, 1974

[54] LASER GRATING COUPLERS

[75] Inventors: James Y. Wada; Gareth M. Janney, both of Los Angeles, Calif.

[73] Assignee: The United States of America as represented by the Secretary of the Air Force, Washington, D.C.

[22] Filed: Nov. 27, 1973

[21] Appl. No.: 419,458

[52] U.S. Cl..... 331/94.5 C, 331/94.5 G, 350/162 R
[51] Int. Cl............................................. H01s 3/02
[58] Field of Search................ 331/94.5 C, 94.5 G; 350/162 R

[56] References Cited
UNITED STATES PATENTS
| | | | |
|---|---|---|---|
| 3,654,569 | 4/1972 | Hausmann | 331/94.5 C |
| 3,674,335 | 7/1972 | Ashkin et al. | 350/162 R |
| 3,720,885 | 3/1973 | Koloc | 331/94.5 G |

*Primary Examiner*—Eli Lieberman
*Attorney, Agent, or Firm*—Harry A. Herbert, Jr.; George Fine

[57] ABSTRACT

Gratings are utilized as couplers and reflectors in which the components are exposed to high speed gas flow.

2 Claims, 4 Drawing Figures

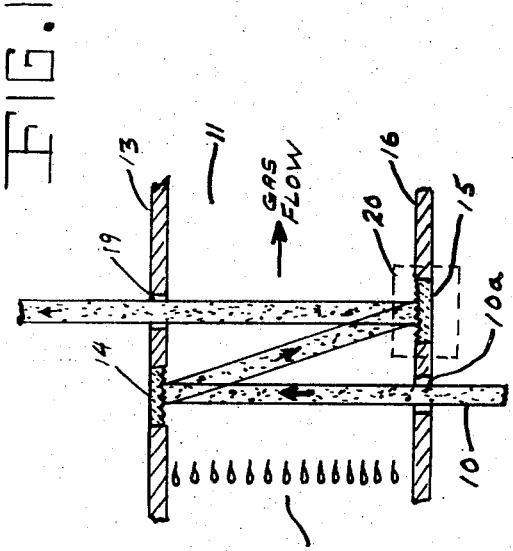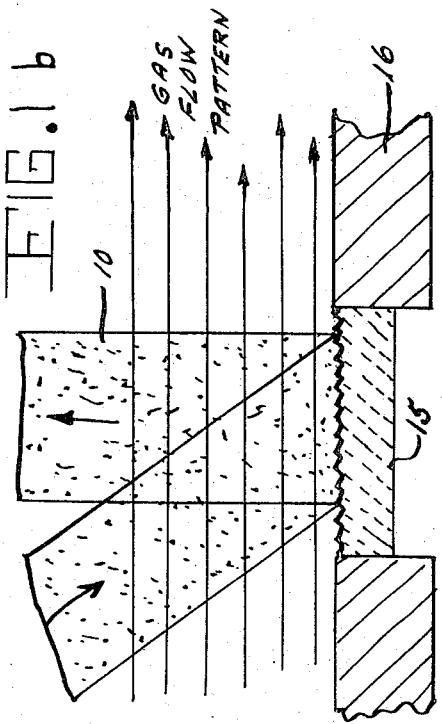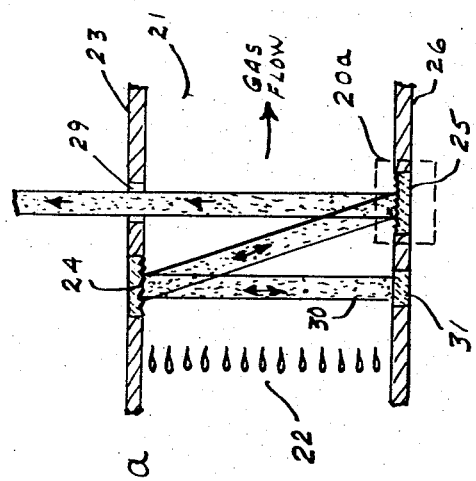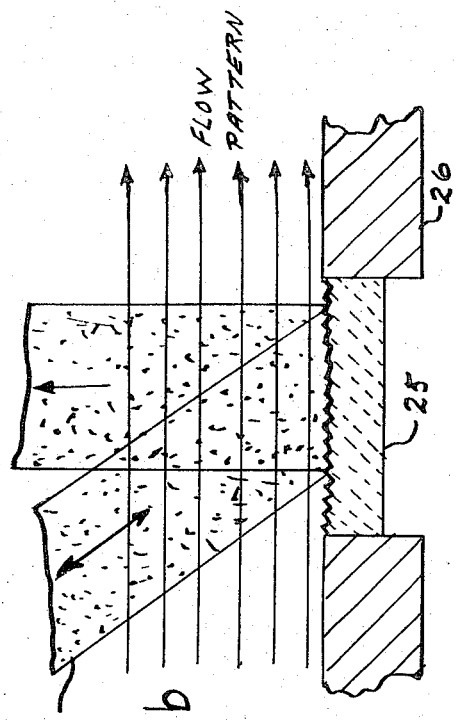

LASER GRATING COUPLERS

BACKGROUND OF THE INVENTION

This invention is concerned with the application of gratings as reflectors and couplers in laser and other optical systems in which the components are exposed to high speed gas flow. The critical requirements for achieving the high optical quality of a system in the presence of fast flowing gas are to minimize the physical disturbance and to maintain a good medium quality in its optical path. Use of conventional mirrors and couplers in directing the optical beam generally requires some angular displacements of these parts. In many cases the mirror position is such that it might distort the flow pattern of gas and lead to undesirable medium inhomogeneity. For supersonic flow, shockwaves and turbulence may cause a serious degradation of the optical quality of the system. Much of this can be avoided with grating mirrors and couplers. This invention makes the desired beam direction possible without seriously affecting the aerodynamic properties and the optical qualities of a fast flowing system.

Types of medium distortions which occur in a conventional approach is in an optical system such as a laser amplifier consisting of two folding mirrors and the fast flowing active medium. If a mirror body is extended into the fast flowing channel, it will be exposed to excess aerodynamic heating and pressure loading. In order to minimize these aerodynamic effects, the folding mirrors are usually recessed from the channel wall. The medium effect cannot be eliminated completely, however, if the mirror is tilted. The shock waves will be produced and the flow pattern will be distorted. When a step between the channel wall and the mirror structure becomes sufficiently large, the gas flow may separate from the channel wall and produce eddies (or turbulence) near the surface of the mirror. All of these effects lead to the medium inhomogeneity in the path of the laser beam and to the degradation of the phase front uniformity of the beam.

Two simple examples will be cited to illustrate this point. For small mirrors, the step produced between the channel wall and mirror surface will be small. For a 5 cm diameter mirror, a 10mm radian displacement will produce a step on the order of 0.5 mm. Since the boundary layer generally is on the same order of magnitude, such a step will have only a small effect on the flow property of the gas. For a larger system the effect may be significant. If a 50 cm diameter mirror is used, the step will be as much as 5 mm for the same angular displacement. The medium distortion in such a case will have a strong effect on the overall optical quality of the system. Many of the aerodynamic problems associated with the conventional approach can be solved with the technique of the present invention. Using grating reflectors in place of ordinary mirrors, large discontinuities in the channel wall can be eliminated. The optical beam can be directed in any predetermined angle with a proper selection of the grating surface. A highly reflective surface in either a zeroth order or any high order mode of grating is possible simply by changing the line spacing and blaze angle. The grating lines can be oriented in any direction with respect to the gas flow. These lines produce negligible effects on the flow characteristics of the medium. The depth of the grating lines is very small in comparison with the typical boundary layer thickness. The grating couplers offer attractive advantages over that of more conventional couplers (including diffractive coupled mirrors and apertured mirrors).

SUMMARY OF THE INVENTION

Gratings are utilized as reflectors and couplers in lasers and other optical systems in which components are exposed to high speed gas flow. The embodiment of grating reflectors as part of a system exposed to a fast flowing medium minimizes the medium distortion and maintains the high optical quality of the system. The embodiment of grating couplers as part of the optical system minimizes the medium disturbance and maintains the high optical quality of the system.

DESCRIPTION OF THE DRAWINGS

FIG. 1a shows an optical system exposed to high speed gas flow utilizing gratings as reflectors;

FIG. 1b shows section 20 of FIG. 1a enlarged;

FIG. 2a shows an optical system exposed to high speed gas flow utilizing gratings as couplers; and FIG. 2b shows section 21 of FIG. 2a enlarged.

DETAILED DESCRIPTION OF THE PREFERRED EMBODIMENT

Now referring to FIG. 1a, there is shown channel 11. Channel 11 has disposed therein fast flowing gas medium 12. Channel wall 13 has disposed therein by pressure fitting grating reflector 14. Opposite to channel wall 13 is channel wall 16 which has disposed therein also by pressure fitting grating reflector 15. Laser beam 10 is directed through opening 10 in back at a preselected angle to grating reflector 14 to grating reflector 15 and then to and through mirror 19 to provide an output beam therefrom. Mirror 19 is pressure fitted in channel wall 13. The laser beam can be directed in any predetermined angle with a proper selection of the grating surfaces of grating reflectors 14 and 15. A highly reflective surface in either a zeroth order or any high order mode of grating is possible simply by changing the line spacing and angle. The grating lines can be oriented in any direction with respect to the gas flow. These lines produce negligible effects on the flow characteristics of the medium. The depth of the grating lines is very small in comparison with the typical boundary layer thickness.

It is noted the inner surfaces of grating reflector 14 and mirror 19 is flush with the inner surface of channel wall 13. The inner surface of grating reflector 15 is flush with the inner surface of channel wall 16.

FIG. 1b shows an enlargement of section 20 of FIG. 1a wherein gas flow pattern 21 is shown in relationship to laser beam 10. Grating reflector 15 is enlarged to more clearly indicate that the reflecting surface thereof is flush with the inner surface of channel wall 16.

Grating couplers provide attractive advantages over that of more conventional couplers including coupled mirrors and apertured mirrors. Typical embodiment of a grating coupler used also as an end mirror for the laser is shown in FIG. 2a. The use of this type of coupler minimizes the formation of shockwaves and localized turbulent centers. The coupling coefficient and the angular requirements can be selected by the design and choice of grating parameters.

The apparatus of FIG. 2a is similar to that of FIG. 1a. Channel 21 has disposed therein fast flowing gas medium 22. Channel wall 23 has pressure fitted therein grating laser mirror 24 and mirror 29. Channel wall 26 has pressure fitted therein laser resonator mirror 31 and grating coupler 25. Laser beam 30 is shown in aforesaid fast flowing gas medium 22 with the gas flow as indicated. Laser beam is directed by grating laser mirror 24 to grating coupler 25 which then directs the laser beam through mirror 29 to provide an output therefrom.

It is emphasized the inner surfaces of grating laser mirror 24 and mirror 29 is flush with the inner surface of channel wall 23 and inner surfaces of resonating mirror laser 31 and grating coupler 25 is flush with the inner surface of channel wall 26.

Now referring to FIG. 2a which is an enlargement of section 20a of FIG. 2a. Grating coupler 25 is shown in greater detail. Circulating laser beam 30 is shown directed at grating coupler 25 at a preselected angle and then being reflected therefrom to provide a laser output.

It is noted that the embodiment of grating reflectors and couplers as part of a system exposed to a fast flowing medium permits the minimizing the medium distortion and also makes possible the maintenance of the high optical quality of a system.

Possible areas of application are for fast flow lasers (gas dynamic, chemical, electro-aerodynamic lasers). Also the invention may be used for external mirrors and couplers in high speed aircraft and other vehicles.

In the very near future, the potential needs of grating couplers and reflectors may be found in high power lasers. There exist prospects for large gas flowing laser systems for commercial and defense applications. At the present, the laser mirrors which are commonly used in these systems are limited to 10 to 20 cm sizes. More conventional approaches are satisfactory for these present day needs. Rapid progress is being made in the high power laser technology. Mirrors of the size 2 to 3 times larger than that of the present day ones are not inconceivable for advanced systems of the near future.

Utility of the grating reflectors will be important in lasers operating at a pressure higher than that which is currently used in GDL and CL (typically a small fraction of 1 Atm). There is a prospect of improving the specific energy available from an active medium if the gas pressure is increased. Several laboratory experiments have been performed in successfully demonstrating laser actions in gaseous medium with pressure above 1 Atm level. In the high pressure lasers, the degradation effect caused by the medium distortion cannot be ignored. The need for the grating mirrors and couplers should increase for these high pressure lasers.

What is claimed is:

1. Grating reflectors for optical systems exposed to high speed gas flow comprising a channel, said channel having first and second walls opposite to each other, each wall having an inner surface, a gas medium flowing at high speed within said channel, an opening in said first channel wall, a first grating reflector having an inner surface, said grating reflector pressure fitted into said second channel wall with the inner surface thereof flush with said inner surface of said second channel wall, said grating reflector being directly opposite to said opening in said first channel wall, a second grating reflector also having an inner surface, said second reflector being pressure fitted in said first channel wall to permit the inner surface thereof to be flush with the inner surface of said first channel wall, said second grating reflector being positioned at a predetermined distance from said opening, a mirror having an inner surface, said mirror pressure fitted into said second channel wall and having the inner surface thereof flush with said inner surface of said second channel wall, said mirror being directly opposite to said second grating reflector, and a laser beam directed through said opening to said first grating reflector, said first grating reflector directing said laser beam at a preselected angle to said second grating reflector, said second grating reflector directing said laser beam through said mirror to provide an output laser beam therefrom.

2. Grating reflectors for optical systems as described in claim 1 wherein said first and second grating reflectors include first and second grating surfaces respectively, in accordance with beam angle.

* * * * *